Oct. 29, 1957  F. J. WIEGAND  2,811,331
CLAMP FOR PARTS OPERATING AT DIFFERENT TEMPERATURES
Filed May 2, 1951  2 Sheets-Sheet 2
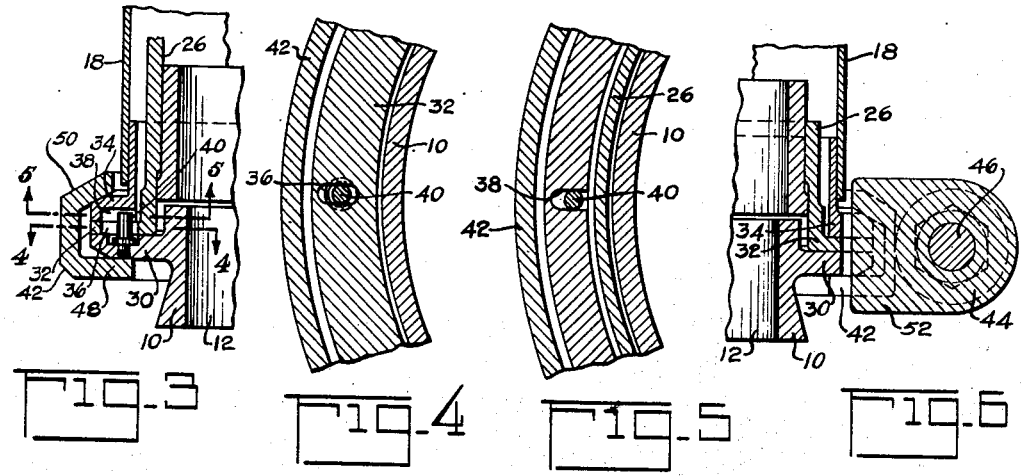
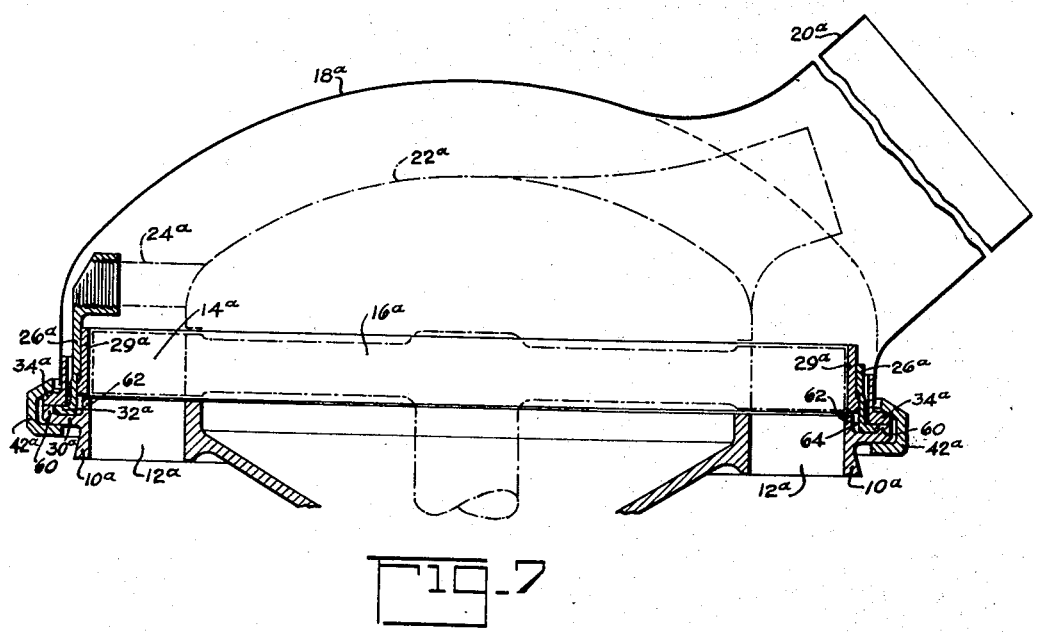
INVENTOR
FRANCIS J. WIEGAND
ATTORNEY

United States Patent Office 2,811,331
Patented Oct. 29, 1957

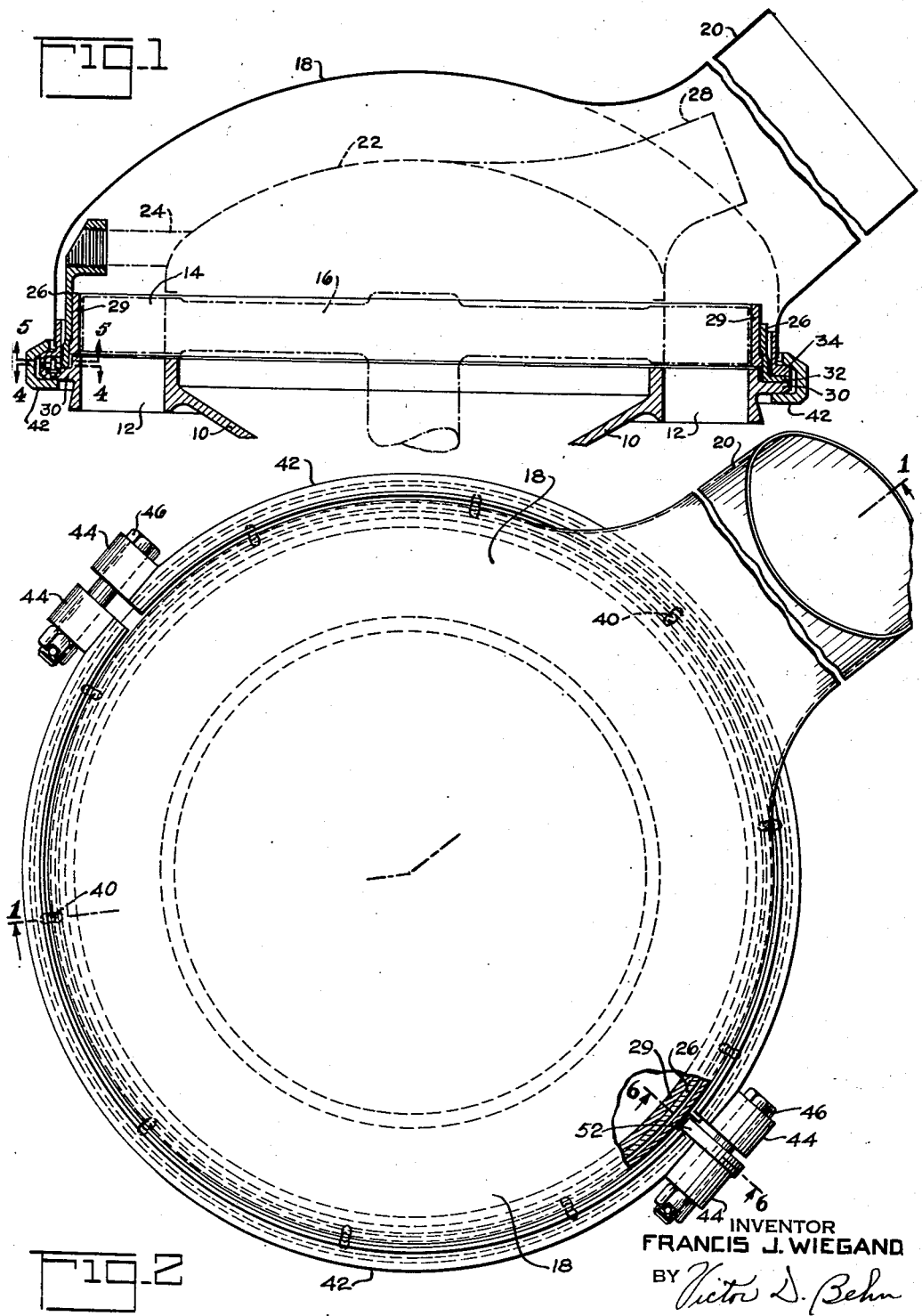

2,811,331
CLAMP FOR PARTS OPERATING AT DIFFERENT TEMPERATURES

Francis J. Wiegand, Ridgewood, N. J., assignor to Curtiss-Wright Corporation, a corporation of Delaware Application May 2, 1951, Serial No. 224,167

7 Claims. (Cl. 253—39)

This invention relates to clamping means and is particularly directed to means for clamping together parts subject in operation to different temperatures.

The invention has been designed for use in connection with a gas turbine having an exhaust gas hood or duct and a cooling cap clamped to the turbine stator structure, said gas turbine being designed for the power plant illustrated in copending application Serial No. 760,385, filed July 11, 1947, now Patent No. 2,607,189. As will appear however, the invention is not limited to this specific use. In general said clamped turbine parts—namely the turbine stator, exhaust gas hood and cooling cap—operate at different temperatures whereby as the turbine heats up they tend to expand in different amounts. If these parts are rigidly clamped together without some freedom for relative radial expansion, then one or more of said parts may distort as a result of differences in their expansions with increase in temperature. An object of the present invention comprises the provision of novel means for clamping two or more annular parts together so as to permit some relative expansion of said parts while at the same time maintaining said parts at least substantially co-axial.

Other objects of the invention will become apparent upon reading the annexed detailed description in connection with the drawing in which:

Fig. 1 is an axial sectional view through a gas turbine embodying the invention;

Fig. 2 is a top view, partly in section, of Fig. 1;

Fig. 3 is an enlarged view of a portion of Fig. 1;

Figs. 4 and 5 are sectional views taken along lines 4—4 and 5—5, respectively, of Figs. 1 and 3;

Fig. 6 is a sectional view taken along line 6—6 of Fig. 2; and

Fig. 7 is a view similar to Fig. 1 but of a modified form of the invention.

Referring now to Figs. 1–6 of the drawing, a gas turbine is illustrated as comprising a stator 10 having an annular nozzle construction 12 through which combustion gases are directed against the blades 14 of a turbine rotor 16, said rotor being journaled in the stator in any suitable manner (not shown). As already stated said gas turbine is designed for use in the power plant illustrated in said copending application. As disclosed in said application the turbine motive fluid constitutes the exhaust gases of an internal combustion engine and said turbine rotor 16 is drivably connected to the crankshaft of the engine. The exhaust gases discharge from the turbine rotor blades 14 through a hood 18 having an exhaust gas duct 20 extending therefrom. In addition a cap 22 is supported over the central portion of the turbine rotor 16 by a plurality of radial spokes 24 extending from a ring 26. The function of the cap 22 is to receive cooling air which is blown between the root ends of the turbine rotor blades 14, by means not shown, said cap directing the cooling air through a duct 28 into the exhaust duct 20. A sleeve 29 is rigidly secured to the cooling cap ring 26, said sleeve being disposed around the outer periphery of the rotor blades 14 to provide a small operating clearance between said stationary sleeve 29 and the adjacent rotor blades. The turbine rotor 16 and cooling cap 22 have been illustrated by dot-and-dash lines because their specific details form no part of the present invention.

The cooling cap 22 and exhaust hood 18 are secured to the turbine stator 10. For this purpose, the turbine stator 10 has an annular flange 30, the cooling cap ring 26 has an annular flange 32 and the exhaust hood 18 has an annular flange 34. The annular flanges 30, 32 and 34 all extend radially outwardly and are disposed axially against each other with the flange 32 disposed between the flanges 30 and 34. The engaging surfaces of the flanges 30, 32 and 34 are flat so as to permit relative radial expansion and contraction between said flanges.

The cooling cap flange 32 is provided with a plurality of circumferentially-spaced radially-extending elongate slots or through grooves 36 and the exhaust hood flange 34 is provided with an equal plurality of circumferentially-spaced radially-extending elongate grooves 38 disposed in alinement with the slots 36 of the flange 32. The flange 30 is provided with a plurality of circumferentially-spaced pins 40 projecting axially therefrom toward the flanges 32 and 34. Each pin 40 is rigidly secured to the flange 30 and projects through a slot 36 and into the alined groove 38. As illustrated, each pin 40 has a diameter equal to the width of its associated slot 36 and groove 38. With this construction, the flanges 30, 32 and 34 are free to expand and contract radially while the fit between the pins 40 and the side walls of the elongate slots 36 and grooves 38 maintains said flanges co-axial. Maintenance of this co-axial relationship is important because the turbine rotor blades 14 operate with only a small radial clearance relative to the adjacent stator structure.

A clamping ring 42 is provided for clamping the exhaust hood flange 34 and the cooling cap flange 32 to the turbine stator flange 30 thereby securing said exhaust hood and cooling cap in position. The clamping ring 42 has a channel-shaped cross-section opening radially inwardly toward the axis of the turbine rotor. As illustrated this clamping ring is made in two substantially semi-circular halves disposed in end-to-end relation to form a complete annulus. A boss 44 is provided at each end of the halves of the ring 42 and at each junction of the ring halves a bolt 46 extends through the adjacent ring bosses to draw said halves together. The channel-shaped clamping ring 42 is disposed so that its channel bridges the flanges 30, 32 and 34 with the annular side walls 48 and 50 of said channel overlying the remote sides of the flanges 30 and 34 respectively. The channel side wall 48 is flat while the channel side wall 50 is conical and diverges from the channel side 48 whereby when the two halves of the ring 42 are drawn radially inwardly by the bolts 46 the flanges 30, 32 and 34 are axially squeezed between the channel sides 48 and 50 thereby firmly securing the exhaust hood 18 and cooling cap 22 to the turbine stator.

In assembly, the ring 42 is disposed in position to straddle the flanges 30, 32 and 34 and the ring bolts 46 are tightened to draw the two halves of the ring 42 radially inwardly thereby axially squeezing the flanges 30, 32 and 34 between the side walls 48 and 50 of the ring 42. The bolts 46 are tightened to such an extent that the flanges 30, 32 and 34, although firmly held together, can still expand and contract radially relative to each other. Accordingly, notwithstanding the fact that the flanges 30, 32 and 34 are firmly clamped together, except for friction between the flange 30 and the flat side wall 48 and the flange 32, the flange 30 is free to expand and contract radially relative to the flanges 32 and 34 and to the ring 42. Similarly, except for friction therebetween, the flange 32 is free to expand and contract radially relative to the flanges 30 and 34 and to the ring 42.

At the same time, the pins 40 and their associated slots 36 and grooves 38 maintain said flanges 30, 32 and 34 co-axial. The conical surface of the side wall 50 of the ring 42 preferably mates with a conical surface on the exhaust hood flange 34 as illustrated rather than with such a surface on the flange 30 because the ring 42 has substantially the same operating temperature as that of the exhaust hood 18 whereby the axially clamping pressure exerted by the ring 42 remains substantially constant.

Obviously the aforedescribed construction may be used to clamp any two or more parts together, which may operate at different temperatures, so as to permit relative expansion and contraction of said parts without causing overstressing or distortion of said parts. For example the invention may be used to provide a connection between a pair of members of a mechanism whose operating temperature is lower instead of higher than its shut down temperature.

The turbine exhaust hood 18 and cooling cap 22 are designed to be mounted in a particular rotative position on the stator 10. In order to insure proper orientation of said hood and cap relative to the turbine stator, one of the bosses 44 of the ring 42 is provided with a flange 52 which is adapted to be received within slots in the flanges 30, 32 and 34, as best seen in Figs. 2 and 6.

If the relative radial expansion and contraction of the flanges 30, 32 and 34 is small then the construction of Fig. 7 may be used. In Fig. 7 those parts corresponding to the parts of Figs. 1–6 are designated by the same reference numerals but with a subscript $a$ added thereto.

In Fig. 7, the pins 40, slots 36 and grooves 38 have been eliminated and in their place radial displacement of the flange 32a relative to the flange 30a is restricted by an annular shoulder 60 formed about the outer edge of the flange 30a and overlying the outer edge of the flange 32a and by the shoulder 62 formed at the inner edge of the flange 30a and overlying the inner edge of the flange 32a. The structure of Fig. 7 is otherwise substantially like that of Figs. 1–6.

In operation the turbine nozzle runs hotter than either the exhaust hood or the cooling cap. In Fig. 7, therefore, as the turbine heats up the turbine nozzle flange 30a will expand radially outwardly faster than the cooling cap flange 32a. For this reason, the parts are dimensioned so that when the turbine is shut down and cold there is, as illustrated, little or no clearance between the shoulder 60 and the outer periphery of the flange 32a but there is clearance 64 between the shoulder 62 and the inner edge of the flange 32a. Similarly when the turbine is running at its operating temperature, there is little or no clearance between the shoulder 62 and the inner edge of the flange 32a but there is clearance between the shoulder 60 and the outer edge of the flange 32a. Thus the clearance 64 is approximately equal to the difference between the radial expansions of the flanges 30a and 32a as the turbine heats up. With this construction, the shoulder 60 maintains the flanges 30a and 32a substantially co-axial when the turbine is shut down and the shoulder 62 maintains the flanges 30a and 32a substantially co-axial when the turbine is running at its operating temperature. During the transient period while the turbine is heating up the radial eccentricity of the flanges 30a and 32a can not exceed one half of the magnitude of the radial clearance 64. The construction of Fig. 7 can be used in the turbine environment illustrated when the differences in the radial expansions of the flanges 30a and 32a is not so large as to permit the eccentricity of the turbine rotor blades relative to the adjacent stator structure from exceeding their maximum permissible eccentricity.

In Fig. 7, the exhaust hood 18a is not positively maintained co-axial with the cooling cap 22a and the stator 10a as in Figs. 1–6. However the maximum possible eccentricity of the exhaust hood 18a is small. Thus the maximum possible eccentricity of the exhaust hood flange 34a relative to the cooling cap flange 32a is determined by the radial clearance between the exhaust hood 18a and the cooling cap ring 26a. Furthermore it obviously is not essential that the exhaust hood 18a be maintained precisely co-axial with either the cooling cap 22a or the stator 10a.

As illustrated in both modifications described a channel shaped clamping ring is drawn radially inwardly about radially outwardly projecting annular flanges for axially clamping said flanges together. Obviously, however, this structure could be reversed so that said annular flanges project radially inwardly with the clamping ring arranged to be expanded radially outwardly about said flanges to clamp said flanges axially together. Accordingly while I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In combination with a mechanism in which at least a portion of said mechanism has a different temperature during operation of said mechanism as compared to the temperature of said portion when the mechanism is shut down; a pair of members each having an annular radially-extending flange co-axial with and disposed axially against the corresponding flange of the other of said members, the engaging surfaces of said flanges being flat and upon initiation of operation said mechanism one of said flanges undergoing a larger temperature responsive change in radial dimension than the other of said flanges; a plurality of circumferentially-spaced pins on one of said flanges and projecting axially therefrom into a plurality of radially extending grooves in the other of said flanges, there being one pin for each groove with each pin having a width substantially equal to that of its groove and the number and circumferential spacing of said pins and grooves being such as to maintain said members substantially co-axial; ring means having a channel-shaped cross-section with its annular opening directed radially toward and bridging said flanges; and means operatively connected to said ring means for moving said ring means radially toward and about said flanges so that the two annular sides of its channel overlie and engage the remote sides of said flanges with the bottom of said ring means being radially clear of said one flange, one of the annular channel sides of said ring means being flat and the other of its annular channel sides being conical and diverging from said first mentioned side, the temperature of said ring means being closer to that of one of said members than to that of the other of said members during operation of said mechanism and the conical channel side of said ring means engaging the annular flange of said one member and the flat channel side of said ring means engaging the annular flange of said other member whereby as said ring means is so moved radially said flanges are axially clamped together without preventing a subsequent change in their radial dimensions as a result of a temperature change.

2. In combination with a gas turbine having a turbine rotor, a turbine nozzle member for supplying motive fluid to said rotor, an exhaust duct member through which the exhaust gases discharge from said rotor, and a cap member disposed over the central portion of the rotor on its discharge side; each of said members having an annular radially extending flange co-axial with the other of said flanges with the cap member flange disposed between and against the other two of said flanges, the engaging sides of said flanges being substantially flat; ring means having a channel-shaped cross-section with its annular channel opening directed radially toward and bridging said flanges; means operatively connected to said ring means for moving said ring means radially toward and about said flanges so that the two annular sides of its channel overlie and engage the remote sides of said exhaust duct member flange and said nozzle member flange with the bottom of said ring means being radially clear of said nozzle member flange, said channel sides diverging from each other with the side of said channel engaging the nozzle member flange being flat whereby as said ring means is so moved radially said flanges are axially clamped together without preventing a subsequent change in their relative radial dimensions as a result of temperature changes caused by turbine operation; and axially-overlapping cooperating surfaces on said turbine nozzle and cap members for maintaining said members at least substantially co-axial while permitting limited relative radial movement of said members.

3. In combination with a gas turbine having a turbine rotor, a turbine nozzle member for supplying motive fluid to said rotor, an exhaust duct member through which the exhaust gases discharge from said rotor, and a cap member disposed over the central portion of the rotor on its discharge side; each of said members having an annular radially extending flange co-axial with the other of said flanges with the cap member flange disposed between and against the other two of said flanges, the engaging sides of said flanges being substantially flat; ring means having a channel-shaped cross-section with its annular channel opening directed radially toward and bridging said flanges; means operatively connected to said ring means for moving said ring means radially toward and about said flanges so that the two annular sides of its channel overlie and engage the remote sides of said exhaust duct member flange and said nozzle member flange with the bottom of said ring means being radially clear of said flanges, said channel sides diverging from each other with the side of said channel engaging the nozzle member flange being flat whereby as said ring means is so moved radially said flanges are axially clamped together without preventing a subsequent change in their relative radial dimensions as a result of temperature changes caused by turbine operation; and a pair of annular shoulders on said nozzle member flange and between which at least a portion of the cap member flange is disposed, the radial width of said cap member flange portion being less than the radial distance between said annular shoulders and the radial dimensions of said cap member flange portion and said annular shoulders being such that, as a result of relative expansion and contraction of nozzle and cap member flanges, when the turbine is not operating said cap member flange portion is substantially in engagement with one of said shoulders and when the turbine is operating said cap member flange portion is substantially in engagement with the other of said shoulders.

4. In combination with a mechanism in which at least a portion of said mechanism has a different temperature during operation of said mechanism as compared to the temperature of said portion when the mechanism is shut down; a pair of members each having an annular radially-extending flange co-axial with and disposed axially against the other of said flanges, the engaging surfaces of said flanges being flat and upon initiation of operation of said mechanism one of said flanges undergoing a larger temperature responsive change in radial dimension than the other of said flanges; ring means having a channel-shaped cross-section with its annular opening directed radially toward and bridging said flanges; means operatively connected to said ring means for moving said ring means radially toward and about said flanges so that the two annular sides of its channel overlie the remote sides of said flanges with the bottom of said ring means being radially clear of said one flange, said channel sides diverging from each other with one of said sides being flat so that as said ring means is so moved radially said flanges are axially clamped together without preventing a subsequent change in their relative radial dimensions as a result of a temperature change; and a pair of radially-spaced annular shoulders on the one flange and between which at least a portion of said other flange is disposed; said flange portion having a smaller radial dimension than the radial distance between said shoulders such that, and as a result of said difference in the temperature responsive change in the radial dimensions of said flanges, when the mechanism is shut down the radially outer end surface of said flange portion and the facing surface of the radially outer of said shoulders have substantially the same dimension and therefore are in engagement and when the mechanism is operating the radially inner end surface of said flange portion and the facing surface of the radially inner of said shoulders have substantially the same dimension and therefore are in engagement.

5. In combination with a mechanism in which at least a portion of said mechanism has a different temperature during operation of said mechanism as compared to the temperature of said portion when the mechanism is shut down; a pair of members each having an annular radially-extending flange co-axial with and disposed axially against the other of said flanges, the engaging surfaces of said flanges being flat and upon initiation of operation of said mechanism one of said flanges undergoing a larger temperature responsive change in radial dimension than the other of said flanges; ring means having a channel-shaped cross-section with its annular opening directed radially toward and bridging said flanges; means operatively connected to said ring means for moving said ring means radially toward and about said flanges so that the two annular sides of its channel overlie the remote sides of said flanges with the bottom of said ring means being radially clear of said one flange, one of the annular channel sides of said ring means being flat and the other of its annular channel sides being conical and diverging from said first mentioned side, the temperature of said ring means being closer to that of one of said members than to that of the other of said members during operation of said mechanism and the flat channel side of said ring means engaging the annular flange of said other member whereby as said ring means is so moved radially said flanges are axially clamped together without preventing a subsequent change in their radial dimensions as a result of a temperature change; and a pair of radially-spaced annular shoulders on said one flange between which a portion of said other flange is disposed, said flange portion having a smaller radial dimension than the radial distance between said shoulders.

6. In combination with a mechanism in which at least a portion of said mechanism has a different temperature during operation of said mechanism as compared to the temperature of said portion when the mechanism is shut down; a pair of members each having an annular radially-extending flange co-axial with and disposed axially against the other of said flanges, the engaging surfaces of said flanges being flat and upon initiation of operation of said mechanism one of said flanges undergoing a larger temperature responsive change in radial dimension than the other of said flanges; ring means having a channel-shaped cross-section with its annular opening directed radially toward and bridging said flanges; means operatively connected to said ring means for moving said ring means radially toward and about said flanges so that the two annular sides of its channel overlie the remote sides of said flanges with the bottom of said ring means being radially clear of said one flange, one of the annular channel sides of said ring means being flat and the other of its annular channel sides being conical and diverging from said first mentioned side, the temperature of said ring means being closer to that of one of said members than to that of the other of said members during operation of said mechanism and the flat channel side of said ring means engaging the annular flange of said other member whereby as said ring means is so moved radially said flanges are axially clamped together without preventing a subsequent change in their radial dimensions as a result of a temperature change; and a pair of radially spaced annular shoulders on the one flange and between which at least a portion of said other flange is disposed, said flange portion having a smaller radial dimension than the radial distance between said shoulders such that, and as a result of said difference in the temperature responsive change in the radial dimensions of said flanges, when the mechanism is shut down the radially outer end surface of said flange portion and the facing surface of the radially outer of said shoulders have substantially the same dimension and therefore are in engagement and when the mechanism is operating the radially inner end surface of said flange portion and the facing surface of the radially inner of said shoulders have substantially the same dimension and therefore are in engagement.

7. In combination with a mechanism in which at least a portion of said mechanism has a different temperature during operation of said mechanism as compared to the temperature of said portion when the mechanism is shut down; a pair of members each having an annular radially-extending flange co-axial with and disposed axially against the other of said flanges, the engaging surfaces of said flanges being flat and upon initiation of operation of said mechanism one of said flanges undergoing a larger temperature responsive change in radial dimension than the other of said flanges; and ring means having a channel-shaped cross-section with its annular opening directed radially toward and bridging said flanges; means operatively connected to said ring means for moving said ring means radially toward and about said flanges so that the two annular sides of its channel overlie and engage the remote sides of said flanges with the bottom of said ring means being radially clear of said one flange, one of the annular channel sides of said ring means being flat and the other of its annular channel sides being conical and diverging from said first mentioned side, the temperature of said ring means being closer to that of one of said members than to that of the other of said members during operation of said mechanism and the conical channel side of said ring means engaging the annular flange of said one member and the flat channel side of said ring means engaging the annular flange of said other member whereby as said ring means is so moved radially said flanges are axially clamped together without preventing a subsequent change in their radial dimensions as a result of a temperature change; a plurality of circumferentially-spaced first means on one of said flanges; and a corresponding plurality of circumferentially-spaced second means on the other of said flanges, one of said means having radially extending surfaces engageable by the other of said means and both said means being so disposed that said engagement is effective to maintain said members substantially co-axial and at the same time permit relative expansion and contraction of said members by sliding of said other means along said radially extending surfaces.

References Cited in the file of this patent

UNITED STATES PATENTS

| | | |
|---|---|---|
| 913,685 | Boyd | Mar. 2, 1909 |
| 1,380,330 | Ziegler | May 31, 1921 |
| 1,906,826 | Smith | May 2, 1933 |
| 1,969,499 | Bradshaw et al. | Aug. 7, 1934 |
| 2,118,671 | Green | May 24, 1938 |
| 2,253,628 | Krapp | Aug. 26, 1941 |
| 2,463,851 | Browne | Mar. 8, 1949 |
| 2,479,580 | Marco | Aug. 23, 1949 |
| 2,494,328 | Bloomberg | Jan. 10, 1950 |
| 2,605,081 | Alford | July 29, 1952 |
| 2,685,166 | Hasbrouck | Aug. 3, 1954 |